US010019717B2

(12) United States Patent
Sloan et al.

(10) Patent No.: US 10,019,717 B2
(45) Date of Patent: Jul. 10, 2018

(54) PRIORITIZING THREADS FOR AGENT ROUTING

(71) Applicant: ORACLE INTERNATIONAL CORPORATION, Redwood Shores, CA (US)

(72) Inventors: Scott Sloan, Berwyn, PA (US); Christopher Patterson, Los Altos Hills, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1118 days.

(21) Appl. No.: 14/109,676

(22) Filed: Dec. 17, 2013

(65) Prior Publication Data
US 2015/0170153 A1 Jun. 18, 2015

(51) Int. Cl.
| | |
|---|---|
| G06Q 10/00 | (2012.01) |
| G06F 15/02 | (2006.01) |
| G07C 1/10 | (2006.01) |
| G06Q 30/00 | (2012.01) |
| G06F 3/00 | (2006.01) |
| G06Q 50/00 | (2012.01) |

(52) U.S. Cl.
CPC .......... *G06Q 30/016* (2013.01); *G06Q 50/01* (2013.01)

(58) Field of Classification Search
USPC .................. 705/304, 32, 346; 715/700, 751
See application file for complete search history.

(56) References Cited

U.S. PATENT DOCUMENTS

| | | | | |
|---|---|---|---|---|
| 6,415,259 B1 * | 7/2002 | Wolfinger | ........ | G06Q 10/06311 705/7.13 |
| 6,941,514 B2 * | 9/2005 | Bradford | ................ | G06Q 10/06 705/32 |
| 7,787,609 B1 | 8/2010 | Flockhart et al. | | |
| 8,078,982 B2 * | 12/2011 | Fried | ................. | G06F 17/30601 707/803 |
| 8,458,007 B2 * | 6/2013 | Shafiee | ........... | G06Q 10/06316 705/7.26 |
| 8,874,636 B2 | 10/2014 | Tuchman et al. | | |
| 9,553,990 B2 | 1/2017 | Sloan et al. | | |

(Continued)

OTHER PUBLICATIONS

STIC 3600 NPL Rush Search Requested Search Generated Feb. 26, 2018. (Year: 2018).*

(Continued)

*Primary Examiner* — Lynda Jasmin
*Assistant Examiner* — Johnathan J Lindsey, III
(74) *Attorney, Agent, or Firm* — Kilpatrick Townsend & Stockton LLP

(57) ABSTRACT

A method of prioritizing and routing electronic requests, may include accessing, at an incident management system, an incident record. The method may also include assigning, by the incident management system, a priority to the incident record. The method may additionally include causing a thread to be generated in an internal social networking application, wherein the thread is based on the incident record. The method may further include linking the incident record in the incident management system to the thread in the internal social networking application. The method may also include generating an interface for an agent portal to display an indication of the thread within a plurality of thread indications according to the priority.

20 Claims, 11 Drawing Sheets

(56) References Cited

U.S. PATENT DOCUMENTS

| | | | | |
|---|---|---|---|---|
| 2001/0027463 | A1* | 10/2001 | Kobayashi | G06Q 10/10 718/103 |
| 2005/0198305 | A1* | 9/2005 | Pezaris | H04L 12/585 709/227 |
| 2006/0069676 | A1* | 3/2006 | Takatsu | G06F 17/30115 |
| 2006/0271625 | A1* | 11/2006 | Kordun | G06Q 10/10 709/204 |
| 2008/0229213 | A1* | 9/2008 | Hamilton | G06Q 10/10 715/751 |
| 2010/0091967 | A1 | 4/2010 | Costello et al. | |
| 2010/0312605 | A1* | 12/2010 | Mitchell | G06Q 10/06 705/7.13 |
| 2011/0041082 | A1* | 2/2011 | Nguyen | G06Q 10/10 715/752 |
| 2011/0099237 | A1* | 4/2011 | Luzzatto | G06Q 10/10 709/206 |
| 2014/0136434 | A1* | 5/2014 | Posse | G06Q 50/01 705/319 |
| 2016/0352908 | A1 | 12/2016 | Sloan et al. | |

OTHER PUBLICATIONS

International Application No. PCT/US2016/031189, International Search Report and Written Opinion dated Jul. 11, 2016, 12 pages.
U.S. Appl. No. 14/724,872, Non-Final Office Action dated Jun. 28, 2016, 10 pages.
U.S. Appl. No. 14/724,872, Notice of Allowance dated Nov. 28, 2016, 5 pages.

\* cited by examiner

PRIORITIZING THREADS FOR AGENT ROUTING

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Customer relationship management (CRM) provides a framework for managing an institution's interactions with future and current customers. CRM generally involves using technology to organize, synchronize, and/or automate sales, marketing, technical support, and customer service. With special regards to customer service, an Enterprise Software System may include CRM hardware and software that handles requests made by customers, such as call center systems, or online self-help systems.

BRIEF SUMMARY

In one embodiment, a method of prioritizing and routing electronic requests may be presented. The method may include accessing, at an incident management system, an incident record. The method may also include assigning, by the incident management system, a priority to the incident record. The method may additionally include causing a thread to be generated in an internal social networking application, wherein the thread is based on the incident record. The method may further include linking the incident record in the incident management system to the thread in the internal social networking application. The method may also include generating an interface for an agent portal to display an indication of the thread within a plurality of thread indications according to the priority.

In various implementations, the method may also include determining an attribute of the incident record, selecting agent profiles that match the attribute, and sending an electronic invitation to accounts associated with the agent profiles to join the thread. The method may additionally include uploading one or more documents to the thread, wherein the one or more documents address an associated incident. In some embodiments, the priority may be assigned based at least in part on attributes of an associated incident. In some embodiments, the priority may be assigned based at least in part on attributes of an associated client. The incident management system and the internal social networking application may be separate software products in a cloud-based Customer Relationship Management system. Linking the incident record in the incident management system to the thread in the internal social networking application may be performed by the agent portal.

In another embodiment, a non-transitory computer-readable medium may be presented. The non-transitory computer-readable medium may comprise a sequence of instructions which, when executed by one or more processors, causes the one or more processors to prioritize and route electronic requests. The instructions may cause the processor(s) to access, at an incident management system, an incident record. The instructions may also cause the processor(s) to assign, by the incident management system, a priority to the incident record. The instructions may additionally cause the processor(s) to cause a thread to be generated in an internal social networking application, wherein the thread is based on the incident record. The instructions may further cause the processor(s) to link the incident record in the incident management system to the thread in the internal social networking application. The instructions may also cause the processor(s) to generate an interface for an agent portal to display an indication of the thread within a plurality of thread indications according to the priority.

In yet another embodiment, a system may be presented. The system may include one or more processors and a memory communicatively coupled with and readable by the one or more processors. The memory may comprise a sequence of instructions which, when executed by the one or more processors, cause the one or more processors to prioritize and route electronic requests. The instructions may cause the processor(s) to access, at an incident management system, an incident record. The instructions may also cause the processor(s) to assign, by the incident management system, a priority to the incident record. The instructions may additionally cause the processor(s) to cause a thread to be generated in an internal social networking application, wherein the thread is based on the incident record. The instructions may further cause the processor(s) to link the incident record in the incident management system to the thread in the internal social networking application. The instructions may also cause the processor(s) to generate an interface for an agent portal to display an indication of the thread within a plurality of thread indications according to the priority.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
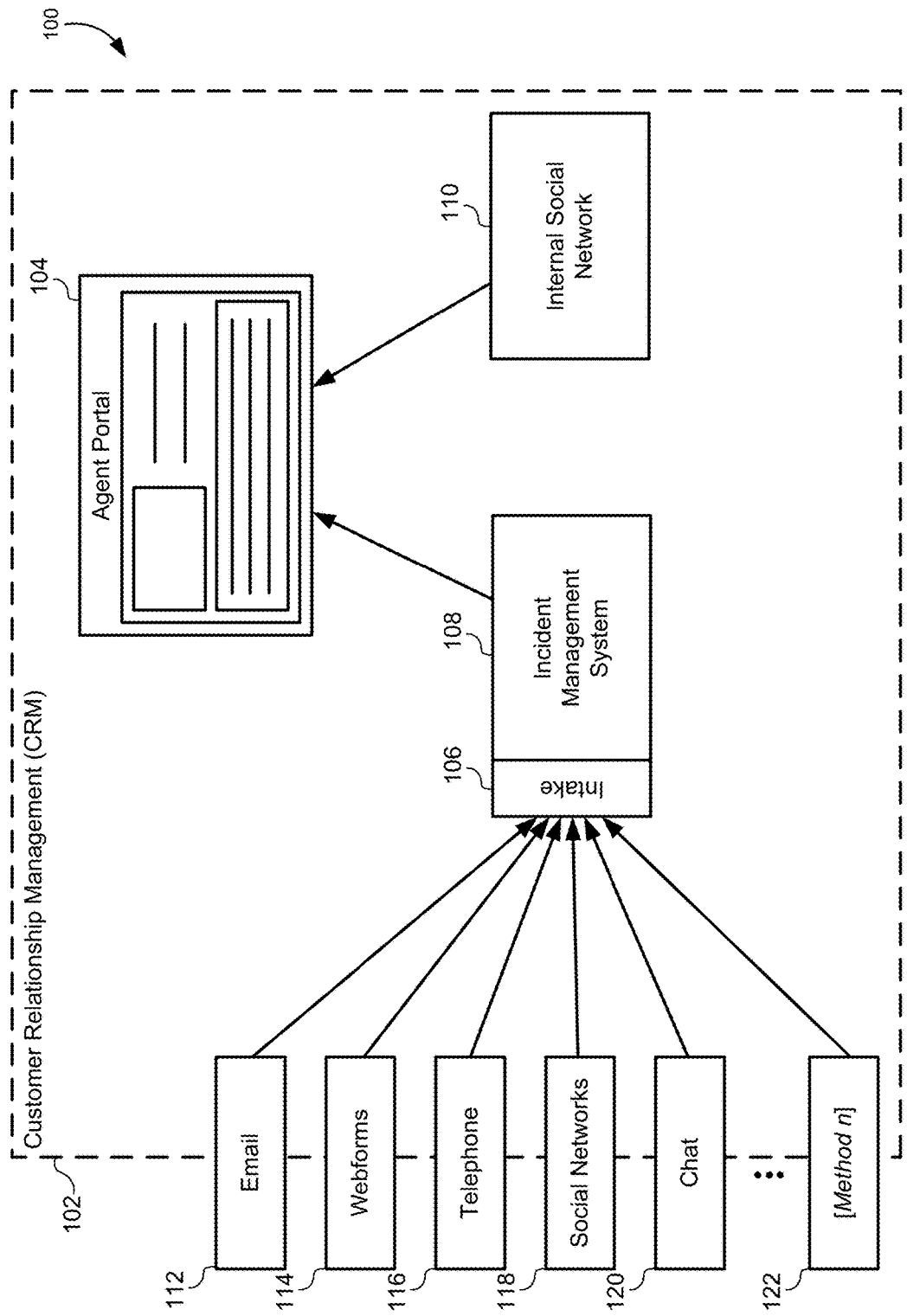
FIG. 1 illustrates a block diagram of a Customer Relationship Management (CRM) system, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments described herein present methods and systems that optimize the routing of electronic incident reports to qualified agents in order to efficiently provide customer service within a Customer Relationship Management (CRM) system. An incident may be received through one of numerous channels, such as a web form, e-mail, a call center, and/or the like. The CRM system may generate an electronic incident record and categorize the record based on the content of the incident. An agent portal may be provided for an agent to view the incident record, and an option may be provided to locate expert agents that may be specially qualified to handle incidents within the determined category. The incident record may also be associated with a priority based on attributes of the instance itself as well as attributes of the customer, the incident management system, and/or any other factor relevant to the incident.

In order to facilitate discussion, collaboration, and an efficient resolution of the incident, the CRM system may be coupled with a social networking application. For example, some Enterprise Software Systems (ESS) may include an internal social networking application that can be integrated by the agent portal. The agent may select the incident, and begin a new discussion thread within the social network application. The thread in the social network application can be linked to the original incident record in the CRM. Thus, the agent portal may allow the agent to upload documents to the discussion thread and invite expert agents who were identified by the agent portal to join the discussion thread. The agent portal may also provide a view of discussion threads to which a particular agent has been invited. The discussion threads may be displayed according to the priority established for the original incident records in the CRM. Therefore, expert agents can easily view and select the most pressing discussion threads in which to participate.

In a CRM system, agents will be able to respond to customer requests for service. Even when facing new problems, customer service agents can look up answers in a knowledge base and/or research a problem in order to find an answer. However, some agents will be better equipped to deal with certain types of customer requests than other agents based on their experience, background, and technical expertise. Inefficiencies create bottlenecks in the CRM system when agents are forced to handle requests that are not within their expertise. This is particularly true when other agents in the CRM system have dealt with similar issues before and could handle these customer requests in a matter of minutes. Therefore, running an efficient CRM system may depend in large part on the system's ability to identify customer service requests and route them to the customer service agent who can most efficiently handle the requested service.

However, problems surface when trying to line up customer requests with customer service agents. Current solutions limit what customer service agents can do to find help servicing a request. In some cases, a receiving agent can send out a mass communication, such as through e-mail, requesting help for particular problem. In other cases, the receiving agent can contact other agents that he/she personally knows to be experts in a field. Oftentimes these cases end up with the request being passed off through multiple agents until the right agent is found. Customer service request then have to be formally transferred between agents within the CRM system. Therefore, current solutions are manifestly inefficient in both finding the right agents respond to request and getting the agent to service the request.

Other problems manifest themselves even after the right agent is located. If an agent is known as an expert in a particular field, other agents may routinely forward many requests in that field to the expert agent. In typical scenarios, the expert agent may receive between 50 and 100 such e-mails per day, a volume that is unserviceable by a single individual. The expert agent then either disregards some customer requests, or the agent is forced to hand off customer requests to other agents. The expert agent is left without any means of sorting or prioritizing received requests in order to identify those requests for which he/she is truly and uniquely suited to handle.

As used herein, the term "incident" may refer to any customer service request. Occasionally, an incident will refer to a problem with a product provided by the entity operating the CRM system, where the product is operated by the customer. For example, an entity may provide a relational database management system to a customer and provide customer service through the incident management system. However, in other cases, the entity providing customer service may be unrelated to the particular product used by the customer, but may instead be contracted to supply support.

Embodiments described herein implement an intelligent system for characterizing customer service requests and classifying/prioritizing these requests such that the optimal customer service agent can be provided with the request and respond efficiently. These embodiments provide a way for a receiving customer service agent to reach out across an enterprise to find anyone that may have the required knowledge (e.g. another agent, a product manager, a consultant, an engineer, or any other subject matter expert) to supplement the service provided. The embodiments described herein replace one-to-one messaging through e-mail and instant messaging with a platform that provides agents a means for starting conversations, sharing documents, adding people to the conversations, and/or the like, throughout the agent community. Therefore, instead of receiving an inbox full of 100 message requests that are unlikely to be serviced, an expert agent can be invited to a conversation within the platform, and thus respond immediately and efficiently.

Some embodiments described herein also provide computerized mechanisms for prioritizing invitations to join conversations in the platform. Different customer service incidents can be prioritized manually or automatically by the computer system and the expert agent can be presented with a prioritized list of conversation invitations. For example, an incident may be classified according to customer importance, the severity of the incident, how widespread the effects of the incident are, revenue affected by the incident, and/or the like. By automatically prioritizing requests to expert agents, the expert agents can deal with the most important requests first.

FIG. 1 illustrates a block diagram 100 of an examplary CRM system 102, according to some embodiments. The CRM system 102 may include an incident management system 108. As used herein, the term "incident management system" may include any combination of hardware and/or software that is configured to receive reports of incidents from customers, generate electronic incident records, and present the electronic incident records to an agent. As used herein, the term "agent" may refer to a human customer service agent who receives information from the incident management system 108 and attempts to resolve the incident. The term "agent" may also refer to an automated software process that automatically receives electronic incident records and provides a solution based on heuristics derived from previously-implemented solutions to similar incidents. The term "customer" may refer broadly to customers of the entity implementing the CRM system 102. For example, the CRM system 102 may provide technical support for a relational database management system implemented by one or more customers.

The incident management system 108 may include an intake interface 106 that is configured to receive incident reports from a number of different intake channels. The intake channels illustrated in FIG. 1 are merely exemplary and not meant to be limiting. One having skill in the art would recognize that any existing or future intake channel could be configured to work with the embodiments described herein. For example, a customer service e-mail 112 may be directed to the intake interface 106. Web forms 114 provided on a help site could also be routed to the intake interface 106. Telephone conversations 116 may be recorded, transcribed, and/or manually received through the intake interface 106. Additionally, external social networks 118 may be monitored for comments about products/services that may indicate a customer service issue. For example, users may post comments to a Facebook page belonging to the entity operating the CRM system 102. In some embodiments, customers may leave comments on the entity's website in the form of a product review that indicates a customer service issue. Some embodiments may allow for real-time online chat services that allow a customer to interact with an agent. Other intake methods 102 not specifically listed here will be recognized by one having skill in the art.

The incident management system 108 may generate/receive an electronic incident record that describes the incident that led to the customer service communication. For example, an agent receiving a live phone call may enter information manually into the incident management system 108 to generate the incident record. E-mails may be automatically parsed and analyzed to generate an incident record. Similarly, transcripts of telephone calls web forms, chat transcripts, social network posts, and/or the like, may be analyzed automatically or manually and used to generate an incident record.

In order to interact with the incident management system 108, an agent may be provided with an agent portal 104 that includes a graphical user interface to display information to the agent. The agent portal 104 may act as a front-end to the incident management system 108. In the embodiments described herein, the agent portal 104 may also act as a front-end to an internal social network 110. The internal social network 110 may comprise a software product that is bundled with the CRM system 102. Alternatively, the internal social network 110 may comprise a software product that is bundled with a larger Enterprise Software System such that it operates throughout an enterprise. In some embodiments, the internal social network 110 may only be available internally, and may comprise a separate software product from the incident management system 108. Thus, the agent portal 104 is uniquely able to merge the functionality of the incident management system 108 and the internal social network 110 such that they appear to be a seamless part of the same software product. The agent portal 104 allows incident records in the incident management system 108 and conversations in the internal social network 110 to be linked together for the agent's benefit.

Figure 2:
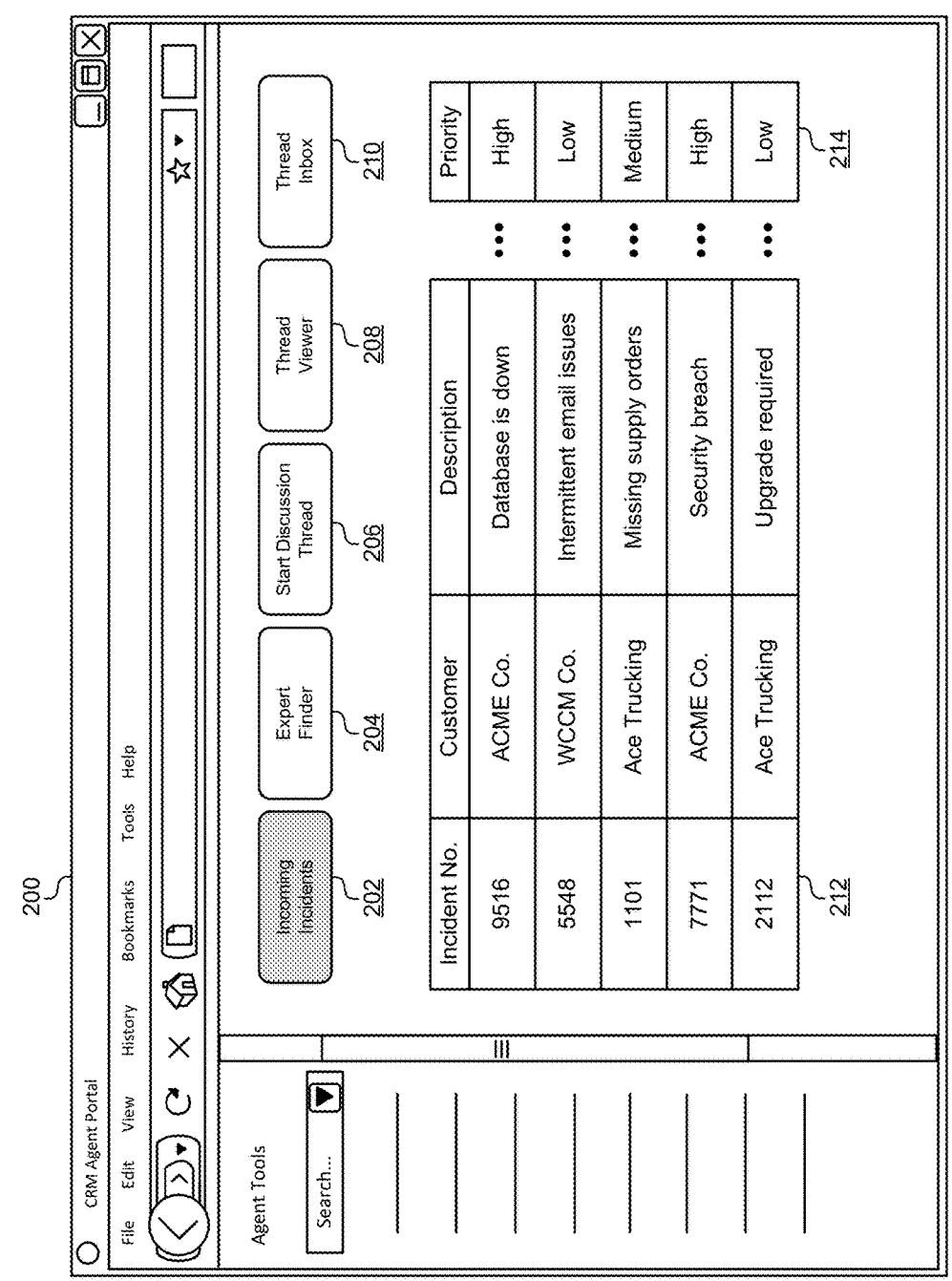
FIG. 2 illustrates an agent portal interface for viewing incoming incidents, according to some embodiments.

FIG. 2 illustrates an agent portal interface 200 for viewing incoming incidents, according to some embodiments. The interface 200 may include a plurality of different options, such as a control to view incoming incidents 202, a control to find an expert 204, a control to start a new discussion thread 206, a control to view an existing thread 208, and/or a control to view all threads in an agent's inbox 210. It will be understood that the arrangement of controls in interface 200 is merely exemplary and not meant to be limiting. Furthermore, additional controls, functions, and information may be available in the interface 200 that are not shown explicitly in FIG. 2. Interface 200 represents merely a simplified agent portal interface in order to describe the functionality below.

First, the agent portal interface 200 may display a list 212 of current incidents. The list 212 may include incidents that are entered by the agent, as well as incidents entered by other agents and routed to the agent. For example, incidents may show up in the list as they are received by an automated e-mail system. Incidents may also show up in the list as they are received by customer service representatives on the phone. In some embodiments, each agent may see a list of all pending incidents and then select those that need to be remedied first. In other embodiments, each agent may see a list of incidents specifically assigned to that agent.

Each incident may be assigned a priority 214. In this particular embodiment, the priorities are assigned as high, medium, and low. However, in other embodiments a numerical value may be assigned, a numerical score may be assigned, a color may be assigned, and/or the like, according to the individual implementation. The priority may be assigned based on one or more factors. In some embodiments, the priority 214 may be assigned based on the type of incident. For example, an agent may receive a phone call alerting them to the fact that a database has gone off-line. The agent may then manually assign a priority 214 of high. Other attributes of the incident may also be used, such as a location, a duration of the incident, a measure of how widespread the incident is, a number of systems affected, a potential cost of the incident, a number of clients affected by the incident, and/or the like. In some embodiments, the priority 214 may also be assigned based on attributes of the particular customer. For example, a relatively minor incident may be elevated to a high-priority if the customer is a high-value client. Customer attributes may include a customer revenue, how long the customer has been a client, a level of service paid for by the customer, a customer profile of different response strategies, and/or the like. Finally, the priority 214 may also be assigned based on attributes of the incident management system itself. For example, the incident management system may limit the number of high-priority incidents in order to not overload the system. The incident management system may also distribute priorities based on a statistical curve, such as a bell curve, such that most incidents are assigned a medium priority while only the most extreme are categorized as either low or high. Incident management system may also assign a priority 214 based on a number of available agents. Other attributes of the incident management system may also be used to assign the priority 214 other than those explicitly listed here. It will also be understood that any of the attributes of the incident, the customer, and/or the incident management system may be combined in any number of different ways to generate the priority 214 for each incident.

In some embodiments, the priority 214 may be adjusted dynamically for each incident based on changing attributes of the customer, the incident, and/or the incident management system. For example, more agents may become available, which may allow priorities to be upgraded from medium to high. In another example, a peak business time interval may pass, and thus the urgency for fixing a certain incident may be downgraded. In yet another example, a customer may sign up for a higher level of customer service, and thus the priority may be increased for any incidents assigned to that customer.

Figure 3A:
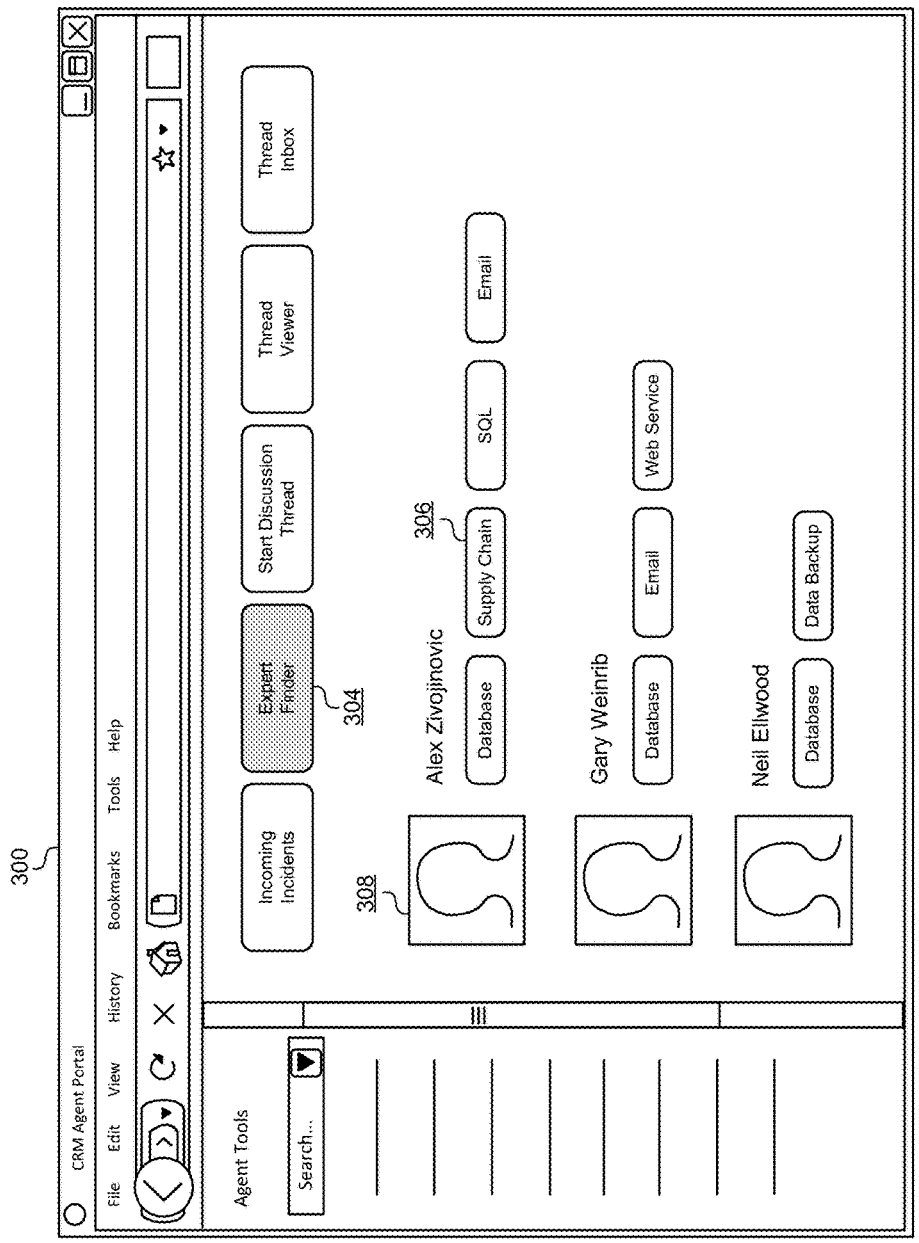
FIG. 3A illustrates an agent portal interface for locating qualified expert agents, according to some embodiments.

FIG. 3A illustrates an agent portal interface 300 for locating qualified expert agents, according to some embodiments. After receiving/generating the incident record, an agent may benefit by receiving assistance from an agent that is more expert in the field. Therefore, the agent portal interface 300 may include an expert finder control 304 that automatically determines one or more expert agents with a known expertise in an area related to the particular incident. As used herein, the term "expert" or "expert agent" may refer to an agent with expertise in a particular area. In some embodiments, the expert agents may be selected from a group of agents at-large and designated as experts in relation to particular incidents. In other embodiments, expert agent may represent a class of agents that is separate from a group of agents at-large.

The agent portal interface 300 may display a list 308 of expert agents that may be qualified to assist with the particular incident. Identifying information for the agents may be provided, along with a list 306 of areas in which the agent has demonstrated a known expertise. For example, a Alex Zivojinovic may have demonstrated an expertise in databases, supply chain management software, SQL, and e-mail, along with other areas. One or more experts may be selected, then a message may be sent to the expert agent(s) requesting help. Additionally, as described below, a social network thread may be started based on the incident, and selecting an expert agent may invite the expert agent(s) to join the social network thread or may automatically add the expert agent(s) to the social network thread.

Figure 3B:
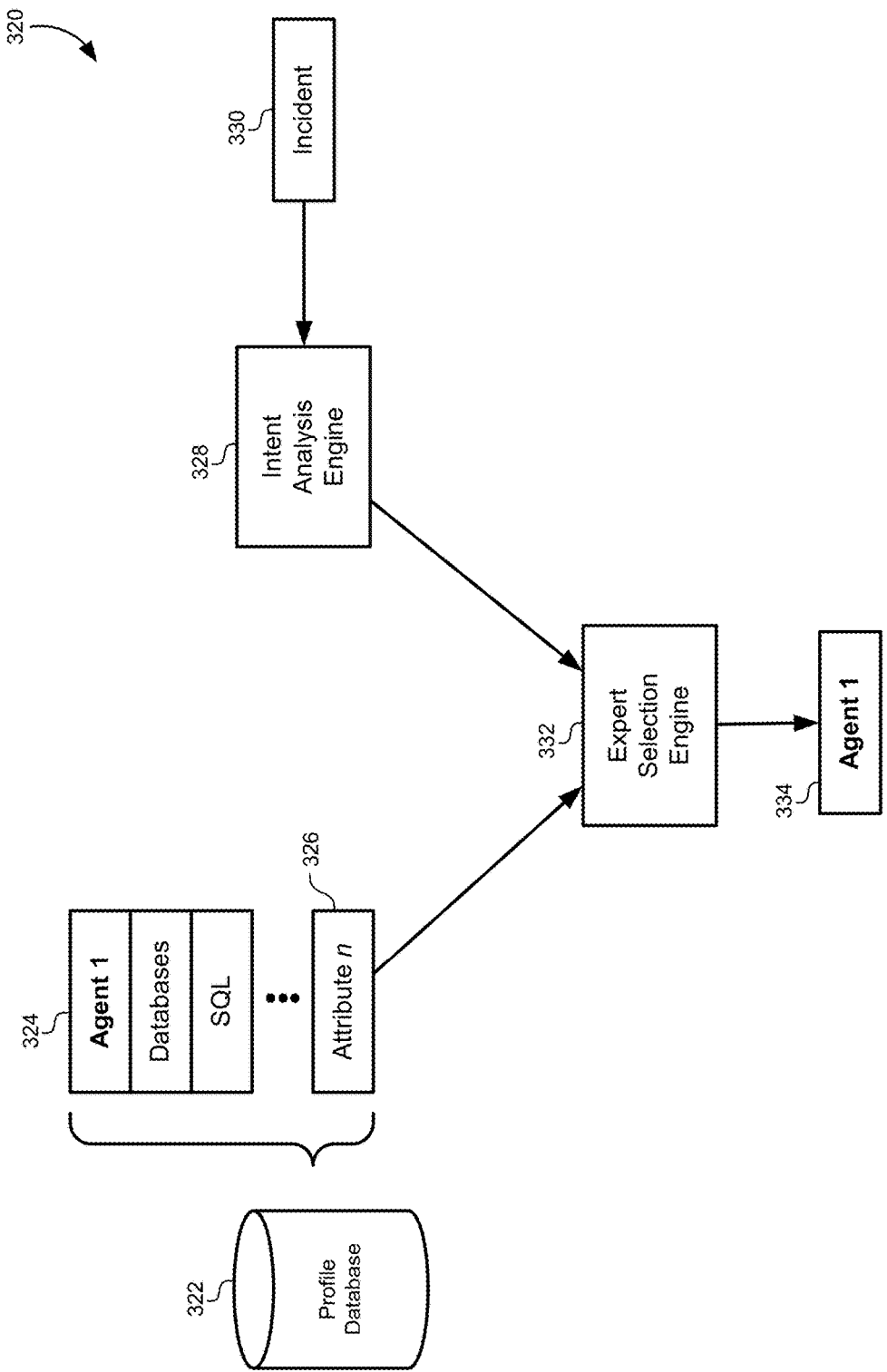
FIG. 3B illustrates a block diagram of a system for identifying expert agents for a particular incident, according to some embodiments.

FIG. 3B illustrates a block diagram 320 of a system for identifying expert agents for a particular incident, according to some embodiments. Each agent or expert agent may have an associated agent profile stored in a profile database 322. Each agent profile may store a list of areas in which the agent has demonstrated an expertise. In some embodiments, each expertise may be referred to as an attribute of the agent profile. Expert attributes may be assigned manually by a supervisor, or may be determined automatically based on a history of incidents resolved by the particular agent. For example, after resolving 20, 50, 100, 200, etc., or more database incidents, an agent may be designated as a database expert. A success rate may also be considered when assigning expert attributes such that a high number of successes along with a high success rate may be required for expert status.

When a particular incident 330 is received, the incident may be analyzed by an intent analysis engine 328. The intent analysis engine may analyze the language used to describe the incident in the incident record to identify keywords, phrases, and/or other attributes that may be used to decode the nature of an underlying incident. The intent analysis engine 328 may perform this analysis based on a historical analysis of similar incidents such that similar incidents would be grouped together and be associated with common attributes. The attributes identified for the incident 330 may then be used to select one or more agents 324 from the profile database 322. In some embodiments, this selection process may be carried out by an expert selection engine 332 that is configured to compare attributes of the incident 330 returned by the intent analysis engine 328 to attributes of agent profiles in the profile database 322. The expert selection engine 332 may then supply a set of agents 334 that are very likely to be experts that can help resolve the incident 330. The set of agents 334 may be displayed in the agent portal interface 300 of FIG. 3A.

Figure 4:
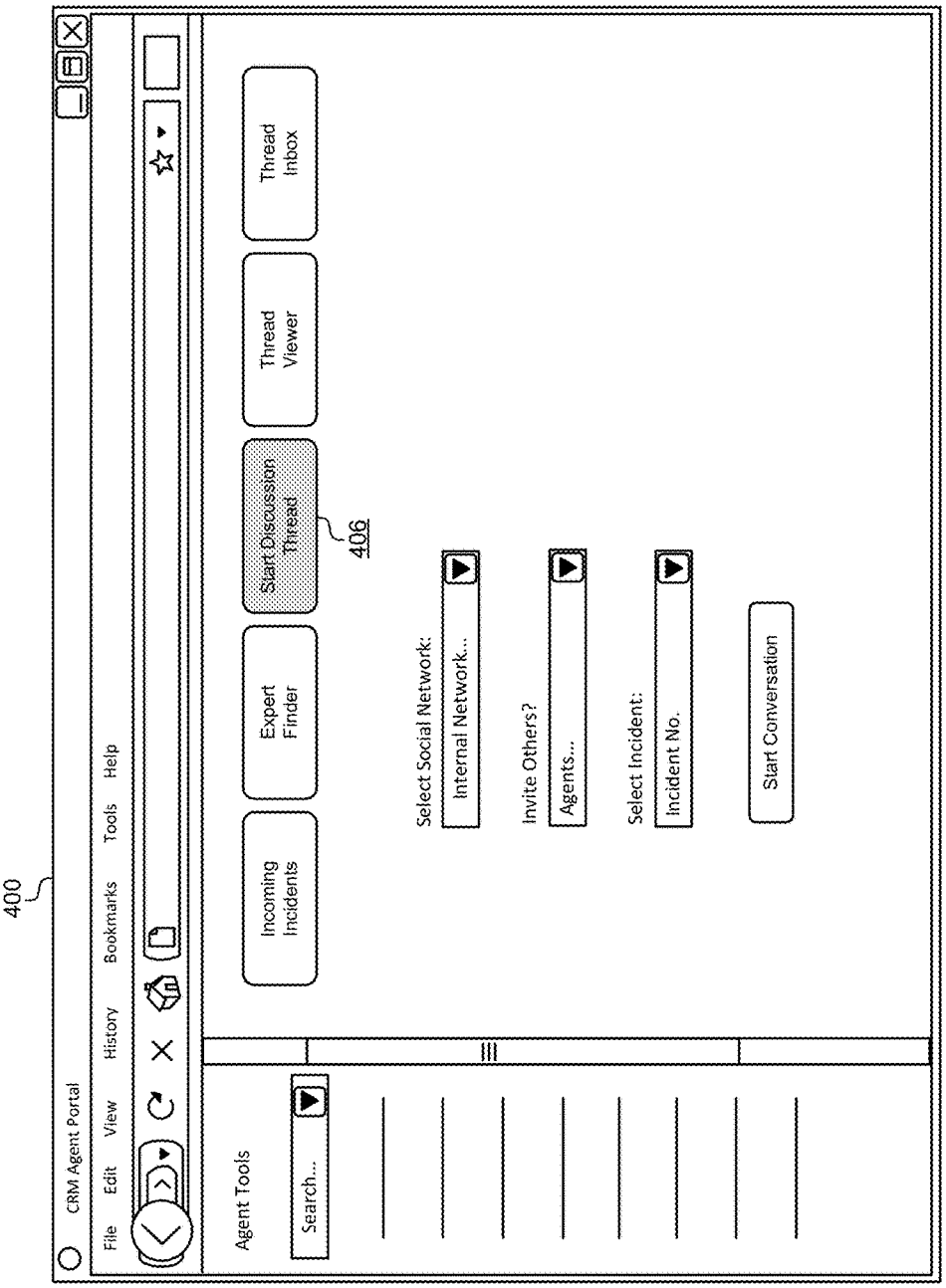
FIG. 4 illustrates an agent portal interface for beginning a new discussion thread, according to some embodiments.

FIG. 4 illustrates an agent portal interface 400 for beginning a new discussion thread, according to some embodiments. As described briefly above, instead of simply flooding known experts with e-mail messages or requests to handle an incident, the embodiments described herein may use the agent portal to combine the underlying functionalities of an incident management system and an internal social network. Using control 406, an agent may begin a discussion of the incident within the social network of the organization. As used herein, the term "thread" may refer to a conversation in a social network in which information can be shared in real time between parties to the conversation. Generally, multiple agents can become part of the conversation, and documents, links, messages, incident records, and/or the like, can be uploaded to the conversation thread as the incident is resolved.

In order to begin a new incident thread, the agent may simply select the incident to be linked to the new thread. Some embodiments may allow an agent to initially invite other agents to join the social network thread as it is initialized. Also, some enterprises may have more than one social network. For instance, there may be a social network for customer service, a social network for product development, and/or the like. Different social networks may exist for several products and "verticals" within an enterprise, which may be selected as the thread is created.

In some embodiments, the data structures storing a thread in the social network may be altered by the agent portal such that information linking it to the incident record may be stored. Internally, and incident ID may be stored in the metadata of the thread in the social network. Other information from the incident record may also be stored in the metadata of the thread, including the incident priority, along with any additional identifying information. However, in another embodiment, the data structures in the social network and the incident management system need not be altered at all, and instead the agent portal may maintain a connection between the social network thread and the incident record. Therefore, the agent portal can simply sit on top of the existing incident management system and social network application without requiring changes to either. For example, the agent portal may store an identifier for the incident record in a table that links it with an identifier for the associated social network thread.

Figure 5:
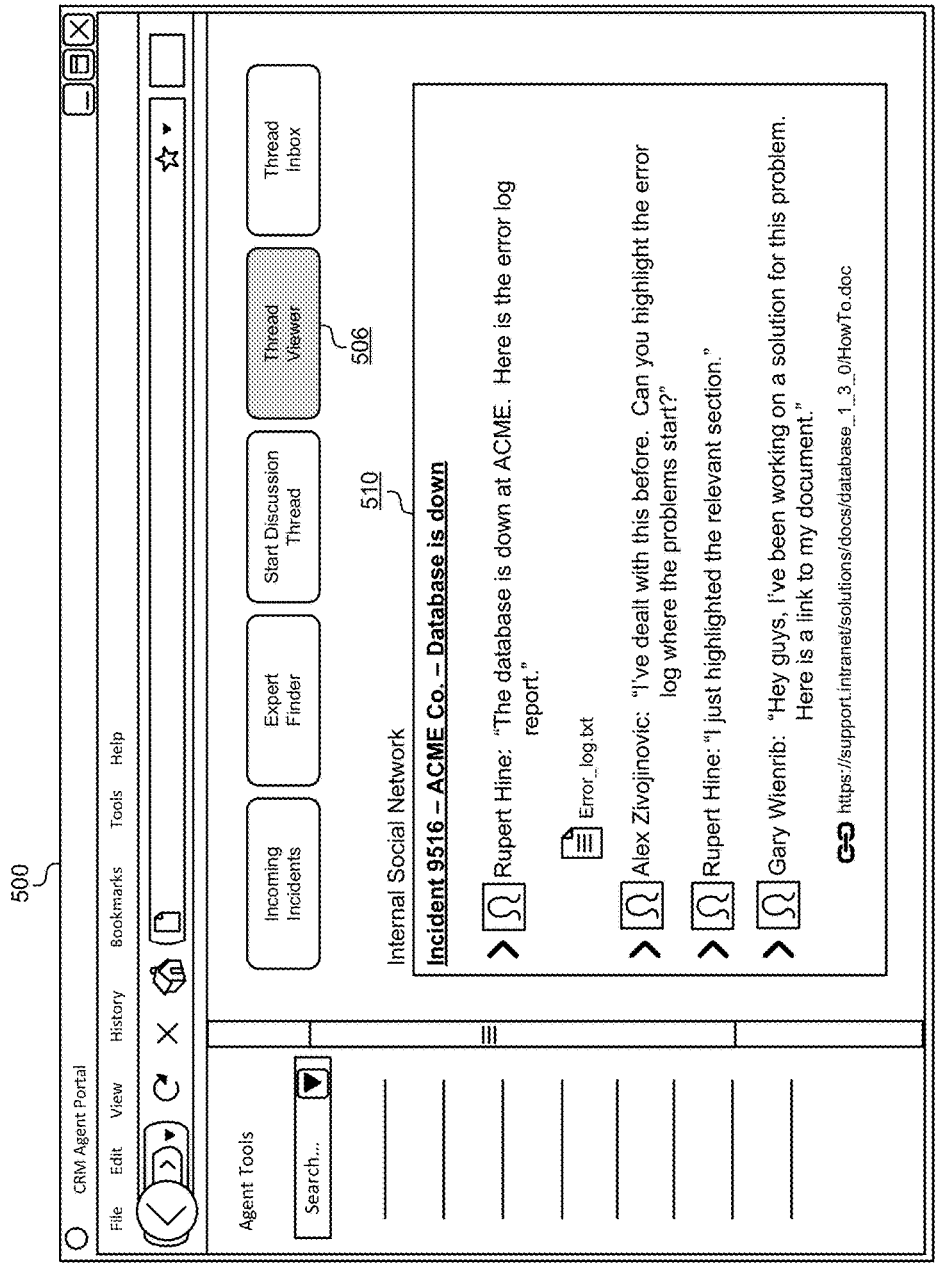
FIG. 5 illustrates an agent portal interface for interacting with a discussion thread, according to some embodiments.

FIG. 5 illustrates an agent portal interface 500 for interacting with a discussion thread, according to some embodiments. An agent may select an option 506 to view active threads within the social network to see the discussion related to incident. Note that the discussion thread illustrated by FIG. 5 is merely exemplary and not meant to be limiting. However, the agent portal interface 500 shows one type of discussion that could be had regarding an incident. As illustrated, the responding agent may upload information such as error logs and transcripts for other agents to see. As they are invited and join the discussion, additional expert agents may weigh in on the incident and provide advice. For example, other agents may recognize the incident as one that they previously helped resolve. Other expert agents may provide links to documents or other solutions that they believe would be helpful in resolving the incident. Note that in one sense, a social network discussion thread may serve as a workplace where documents may be uploaded, highlighted, shared, annotated, and otherwise distributed amongst agents working to solve a single incident. The display 510 of the thread discussion may include information stored in the social network as well as information stored in the incident management system. For example, the incident number, the client, the priority, and/or the details of the incident may be extracted by the agent portal from the incident management system and displayed along with the thread discussion from the social network. Thus, the agent portal interface 500 may operate as a client to the social network such that the agent is not aware of the separation between the two systems.

Figure 6:
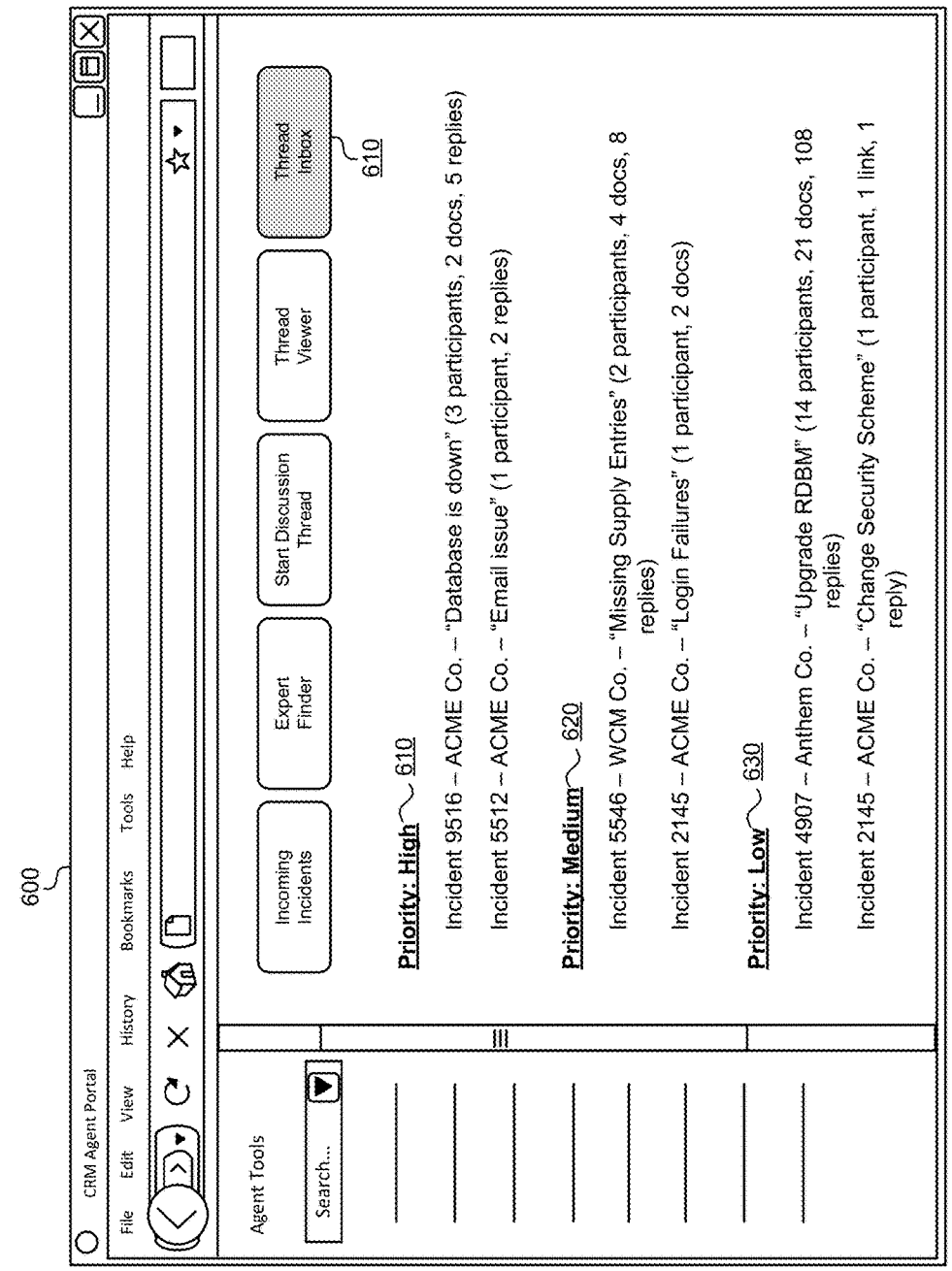
FIG. 6 illustrates an agent portal interface for viewing prioritized threads, according to some embodiments.

FIG. 6 illustrates an agent portal interface 600 for viewing prioritized threads, according to some embodiments. The interface 600 may provide a thread inbox 610 that allows agents to see threads in which they are currently involved, threads to which they have been invited, threads associated with incidents matching their expert attributes, threads within their department, and/or the like. In some embodiments, the social network thread may be displayed according to the priorities taken from the incident management system. Therefore, instead of simply receiving a slew of thread invitations, an expert agent can quickly review the threads that most urgently need his/her attention. In this particular embodiment, the expert agent can see threads according to high priority 610, medium priority 620, and/or low priority 630.

Besides the priority, additional information may also be provided regarding each thread. For example, a thread may display the number of participants, the number of documents, the number of replies, and/or other information about the incident or the thread. In other words, each thread may list information extracted from the incident management system as well as the internal social network. This may allow the expert agent to quickly assess how far along an incident may be on the path to resolution, thus allowing the expert agent to choose when to jump into a thread. For example, a problem and incident may become more clearly defined as it is discussed over time, therefore an expert agent may wait for a thread to mature before getting involved. When the expert agent selects a particular incident listed in the thread inbox, the agent may be taken directly to the social network discussion thread. This allows the expert agent to see a history of the discussion involving the incident at a glance without having to contact other agents or retrieve documents and incident reports on their own.

Figure 7:
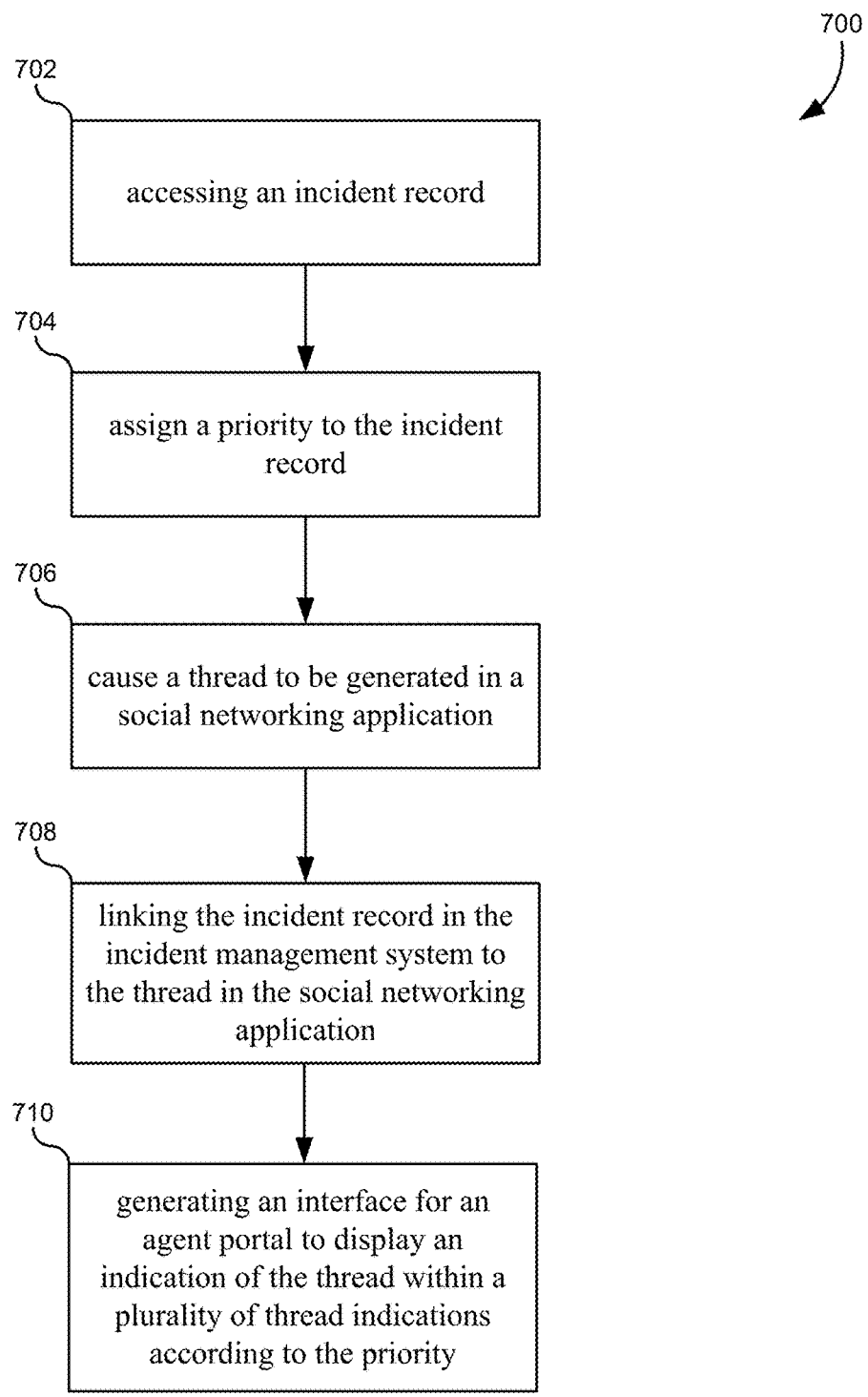
FIG. 7 illustrates a flowchart of a method for optimize routing of incident records to agents, according to some embodiments.

FIG. 7 illustrates a flowchart 700 of a method for optimizing routing of incident records to agents, according to some embodiments. The method may include accessing an incident record (702). The incident record may be received or generated by an incident management system as described above. The method may further include assigning a priority to the incident record (704). In some embodiments, the priority may be assigned based at least in part on attributes of an associated incident. The priority may also be assigned based at least in part on attributes of an associated client. The priority may further be assigned based at least in part on attributes of the incident management system.

The method may also include causing a thread be generated in a social networking application (706). The thread may represent a discussion thread, and may be based on the incident record. In some embodiments, certain information may be automatically imported from the incident record into the social network thread, such as identifying information, priority information, error logs, and/or the like. Some embodiments may also determine attributes of the incident record and select agent profiles that match the attributes of the incident record. This may allow the incident management system to identify expert agents that may be able to help resolve the incident. Electronic invitations may be sent to accounts associated with the agent profiles to join the social network discussion thread. In other embodiments, the expert agent may be automatically added to the discussion thread. Some embodiments may allow for uploading one or more documents that address the associated incident to the thread. Embodiments may also allow other types of content to be uploaded, edited, shared, and distributed through the social network discussion thread.

The method may additionally include linking the incident record in the incident management system to the thread in the social networking application (708). This link may be created in the agent portal such that modifications to the social networking application and/or the incident management system are not required. In some embodiments, the incident management system and the enterprise social networking application may represent separate software products in a cloud-based CRM system.

The method may further include generating an interface for an agent portal to display an indication of the thread within a plurality of thread indications according to the priority (710). The plurality of thread indications may be provided as part of a thread in box as described above. The threads, including the thread for the particular incident, may be arranged within the agent portal according to priority. Some thread-specific details (number of posts, conversation timeline, etc.) may be extracted from the social networking application, while the priority and any other incident information may be extracted from the incident management system by virtue of the link created by the agent portal.

Each of the steps of flowchart 700 may be altered according to any of the features described within this disclosure. Flowchart 700 is merely meant to provide a general framework for executing the operations described in greater detail previously in this disclosure. It should also be appreciated that the specific steps illustrated in FIG. 7 provide particular methods of combining data between a social network application and incident management system to prioritize agent requests according to various embodiments of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
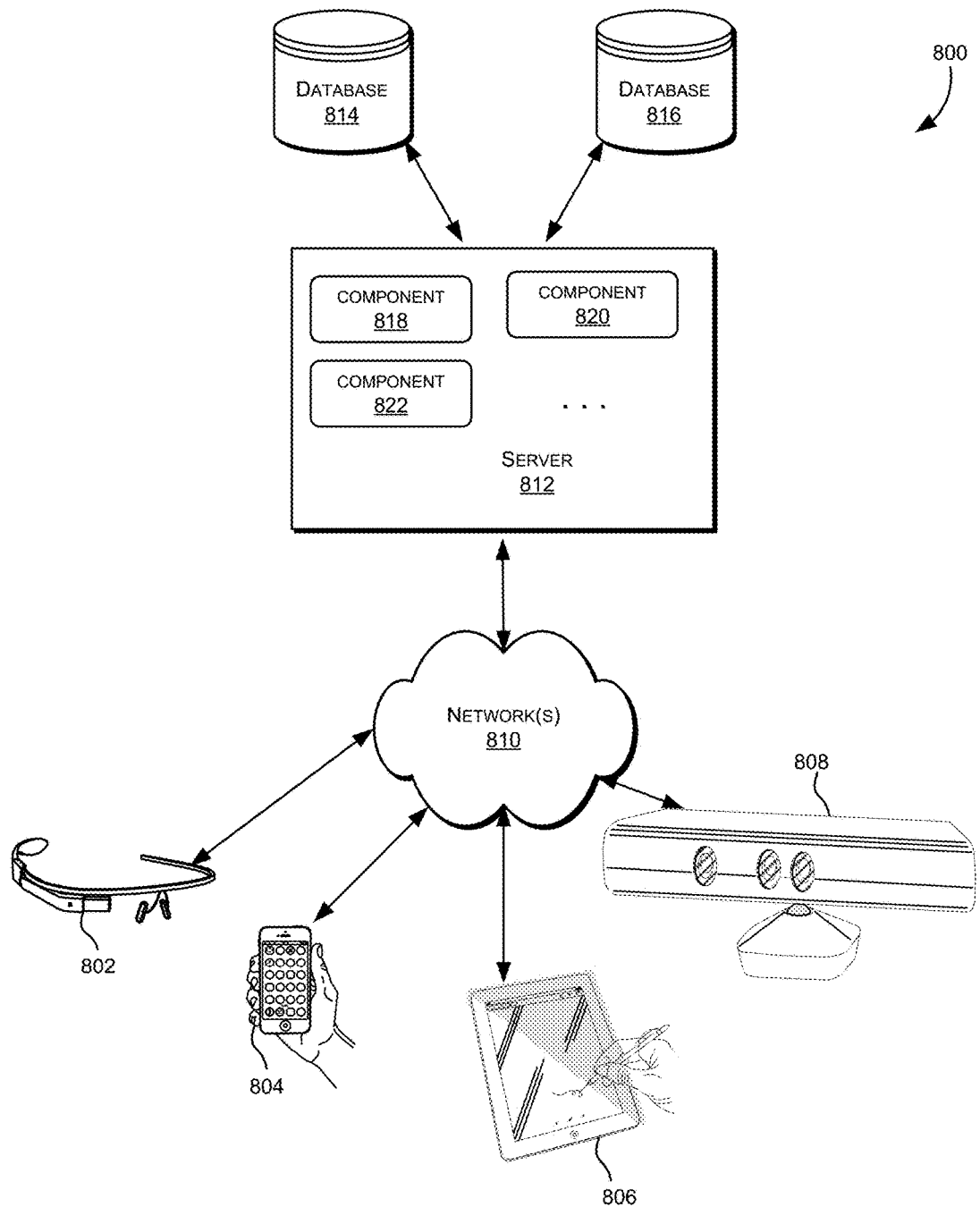
FIG. 8 illustrates a simplified block diagram of a distributed system for implementing some of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
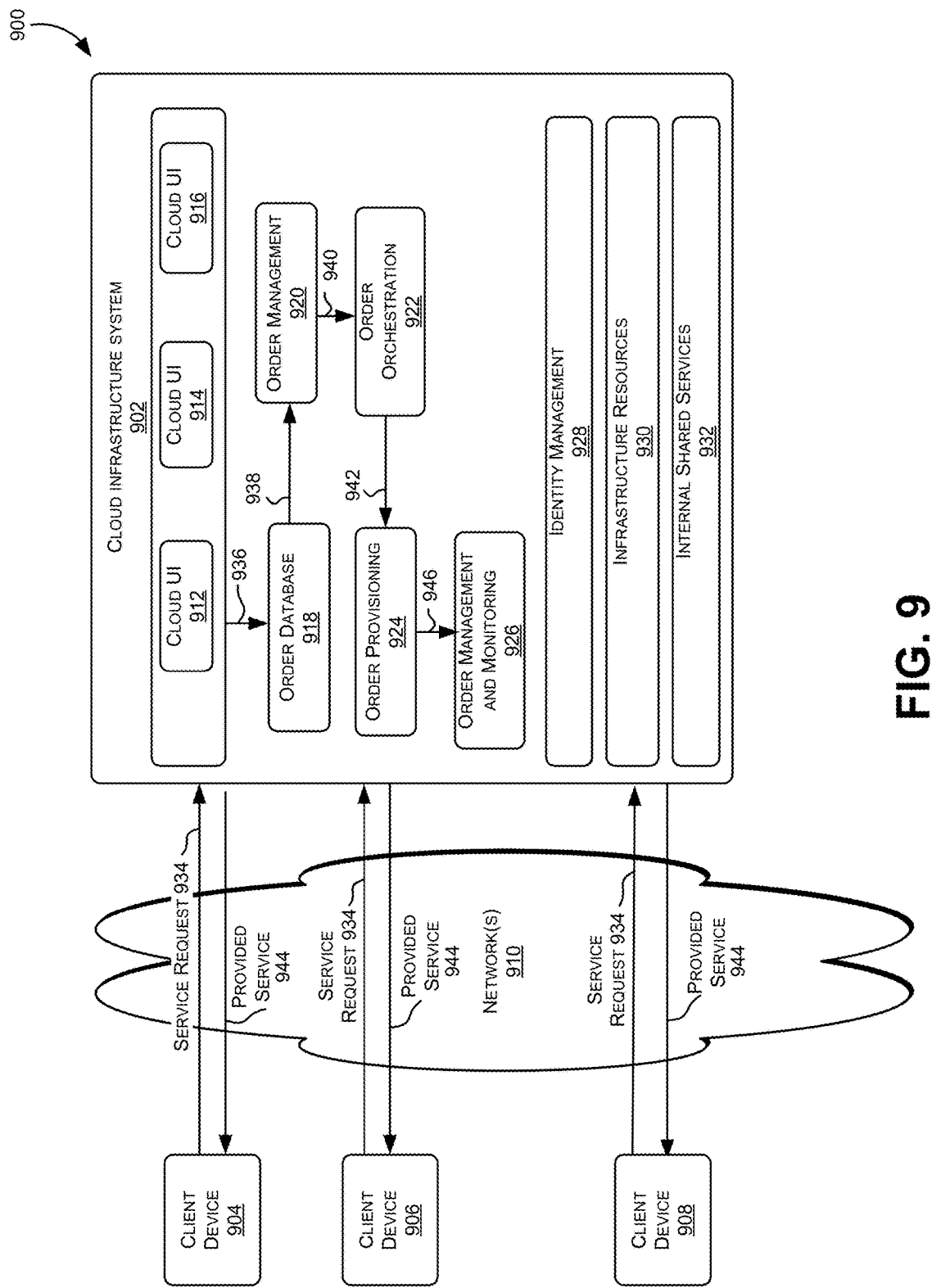
FIG. 9 illustrates a simplified block diagram of components of a system environment by which services provided by the components of an embodiment system may be offered as cloud services.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of business processes associated with each order and applies business logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
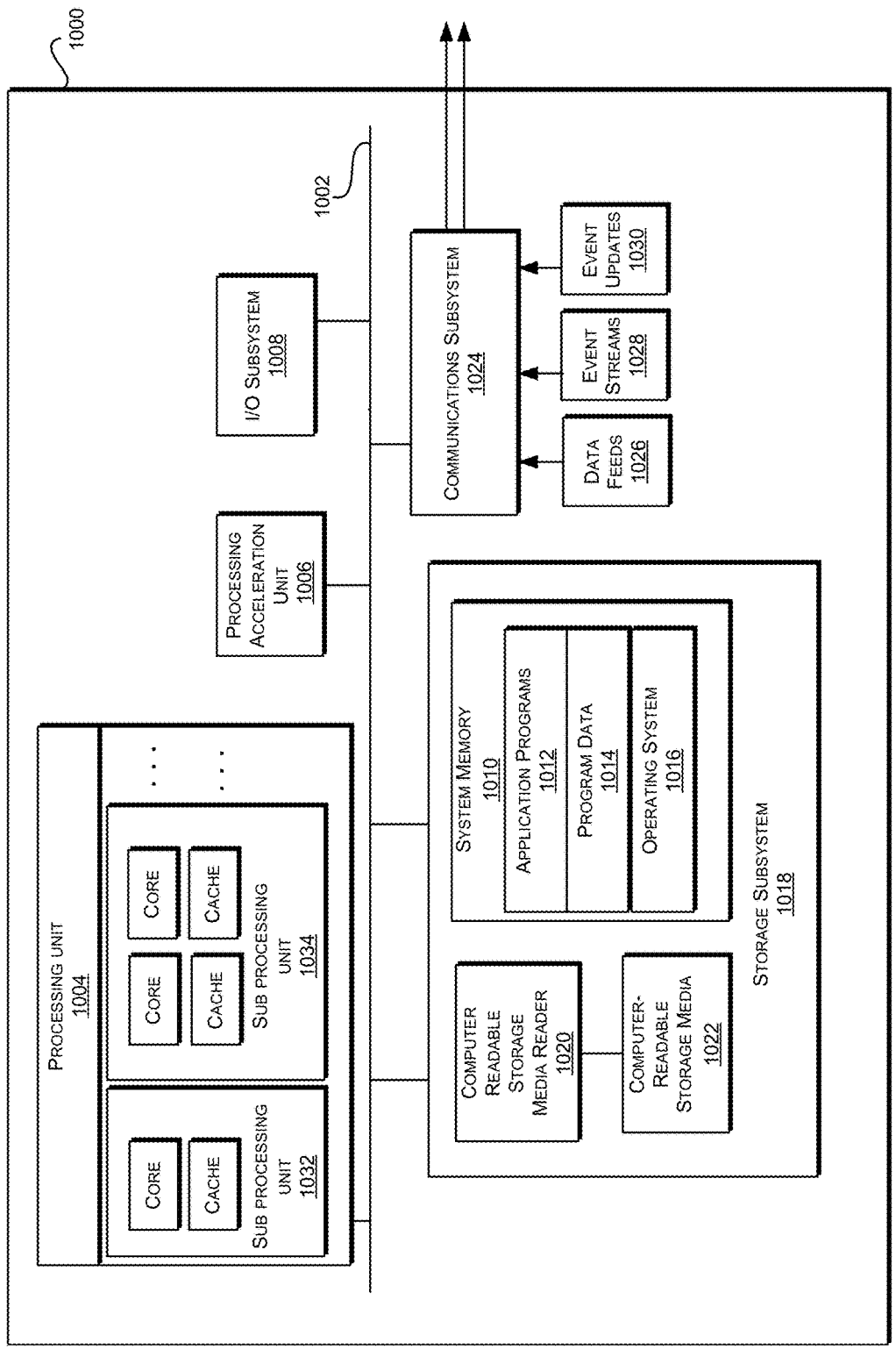
FIG. 10 illustrates an exemplary computer system, in which various embodiments may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method of prioritizing and routing electronic requests, the method comprising:
   accessing, at an incident management system, an incident record, wherein the incident record is a record of a customer service request;
   receiving, by the incident management system, a priority to the incident record;
   causing a thread to be generated in an internal social networking application, wherein the thread is based on the incident record;
   creating a link from the incident record in the incident management system to the thread in the internal social networking application, wherein the thread is associated with the priority;
   generating user interface data for an agent portal interface to display an indication of the thread within a list of a plurality of thread indications, wherein the indication of the thread is arranged within the list of the plurality of thread indications according to the priority relative to a set of priorities associated with the plurality of thread indications in the list, wherein the agent portal interface acts as a front-end to both the incident management system and the internal social networking application, wherein the agent portal interface maintains the link between the incident record and the thread, and wherein the agent portal interface extracts incident details from the incident management system using the link and displays the incident details along with contents of the thread within the agent portal interface when the indication of the thread is selected within the agent portal interface;
   receiving a set of updates to the thread;
   receiving an updated priority, wherein the updated priority is at least partly based on the set of updates to the thread and the priority; and
   updating the user interface data for the agent portal interface such that the indication of the thread is arranged within the list of the plurality of thread indications according to the updated priority relative to the set of priorities associated with the plurality of thread indications in the list.

2. The method of claim 1 further comprising:
determining an attribute of the incident record by analyzing language in the incident record;
selecting agent profiles that match the attribute, wherein each of the agent profiles corresponds to an agent; and
sending an electronic invitation to accounts associated with the selected agent profiles to join the thread.

3. The method of claim 1 wherein the priority is based at least in part on attributes of an associated incident.

4. The method of claim 1 wherein the priority is based at least in part on attributes of an associated client.

5. The method of claim 1 wherein the incident management system and the internal social networking application are separate software products in a cloud-based Customer Relationship Management system.

6. The method of claim 1 wherein linking the incident record in the incident management system to the thread in the internal social networking application is performed by the agent portal.

7. A non-transitory computer-readable medium comprising a sequence of instructions which, when executed by one or more processors, causes the one or more processors to prioritize and route electronic requests by:
accessing, at an incident management system, an incident record, wherein the incident record is a record of a customer service request;
receiving, by the incident management system, a priority to the incident record;
causing a thread to be generated in an internal social networking application, wherein the thread is based on the incident record;
creating a link from the incident record in the incident management system to the thread in the internal social networking application, wherein the thread is associated with the priority;
generating user interface data for an agent portal interface to display an indication of the thread within a list of a plurality of thread indications, wherein the indication of the thread is arranged within the list of the plurality of thread indications according to the priority relative to a set of priorities associated with the plurality of thread indications in the list, wherein the agent portal interface acts as a front-end to both the incident management system and the internal social networking application, wherein the agent portal interface maintains the link between the incident record and the thread, and wherein the agent portal interface extracts incident details from the incident management system using the link and displays the incident details along with contents of the thread within the agent portal interface when the indication of the thread is selected within the agent portal interface;
receiving a set of updates to the thread;
receiving an updated priority, wherein the updated priority is at least partly based on the set of updates to the thread and the priority; and
updating the user interface data for the agent portal interface such that the indication of the thread is arranged within the list of the plurality of thread indications according to the updated priority relative to the set of priorities associated with the plurality of thread indications in the list.

8. The non-transitory computer-readable medium according to claim 7 wherein the instructions further cause the one or more processors to prioritize and route electronic requests by:
determining an attribute of the incident record by analyzing language in the incident record;
selecting agent profiles that match the attribute, wherein each of the agent profiles corresponds to an agent; and
sending an electronic invitation to accounts associated with the selected agent profiles to join the thread.

9. The non-transitory computer-readable medium according to claim 7 wherein the priority is based at least in part on attributes of an associated incident.

10. The non-transitory computer-readable medium according to claim 7 wherein the priority is based at least in part on attributes of an associated client.

11. The non-transitory computer-readable medium according to claim 7 wherein the incident management system and the internal social networking application are separate software products in a cloud-based Customer Relationship Management system.

12. The non-transitory computer-readable medium according to claim 7 wherein linking the incident record in the incident management system to the thread in the internal social networking application is performed by the agent portal.

13. A system comprising:
one or more processors; and
a memory communicatively coupled with and readable by the one or more processors and comprising a sequence of instructions which, when executed by the one or more processors, cause the one or more processors to prioritize and route electronic requests by:
accessing, at an incident management system, an incident record, wherein the incident record is a record of a customer service request;
receiving, by the incident management system, a priority to the incident record;
causing a thread to be generated in an internal social networking application, wherein the thread is based on the incident record;
linking the incident record in the incident management system to the thread in the internal social networking application, wherein the thread is associated with the priority; and
generating user interface data for an agent portal interface to display an indication of the thread within a list of a plurality of thread indications, wherein the indication of the thread is arranged within the list of the plurality of thread indications according to the priority relative to a set of priorities associated with the plurality of thread indications in the list, wherein the agent portal interface acts as a front-end to both the incident management system and the internal social networking application, wherein the agent portal interface maintains the link between the incident record and the thread, and wherein the agent portal interface extracts incident details from the incident management system using the link and displays the incident details along with contents of the thread within the agent portal interface when the indication of the thread is selected within the agent portal interface;
receiving a set of updates to the thread;
receiving an updated priority, wherein the updated priority is at least partly based on the set of updates to the thread and the priority; and updating the user interface data for the agent portal interface such that the indication of the thread is arranged within the list of the plurality of thread indications according to the updated priority relative to the set of priorities associated with the plurality of thread indications in the list.

14. The system of claim 13 wherein the instructions further cause the one or more processors to prioritize and route electronic requests by:

determining an attribute of the incident record by analyzing language in the incident record;

selecting agent profiles that match the attribute, wherein each of the agent profiles corresponds to an agent; and sending an electronic invitation to accounts associated with the selected agent profiles to join the thread.

15. The system of claim 13 wherein the priority is based at least in part on attributes of an associated incident.

16. The system of claim 13 wherein the priority is based at least in part on attributes of an associated client.

17. The system of claim 13 wherein linking the incident record in the incident management system to the thread in the internal social networking application is performed by the agent portal.

18. The method of claim 1, wherein metadata for the thread is stored in a data structure, and wherein linking the incident record in the incident management system to the thread in the internal social networking application comprises altering the metadata for the thread to include an incident ID of the incident record.

19. The non-transitory computer-readable medium according to claim 7, wherein metadata for the thread is stored in a data structure, and wherein linking the incident record in the incident management system to the thread in the internal social networking application comprises altering the metadata for the thread to include an incident ID of the incident record.

20. The system of claim 13, wherein the indication of the thread includes: a topic of the incident record and a set of details for the thread.

* * * * *